UNITED STATES PATENT OFFICE.

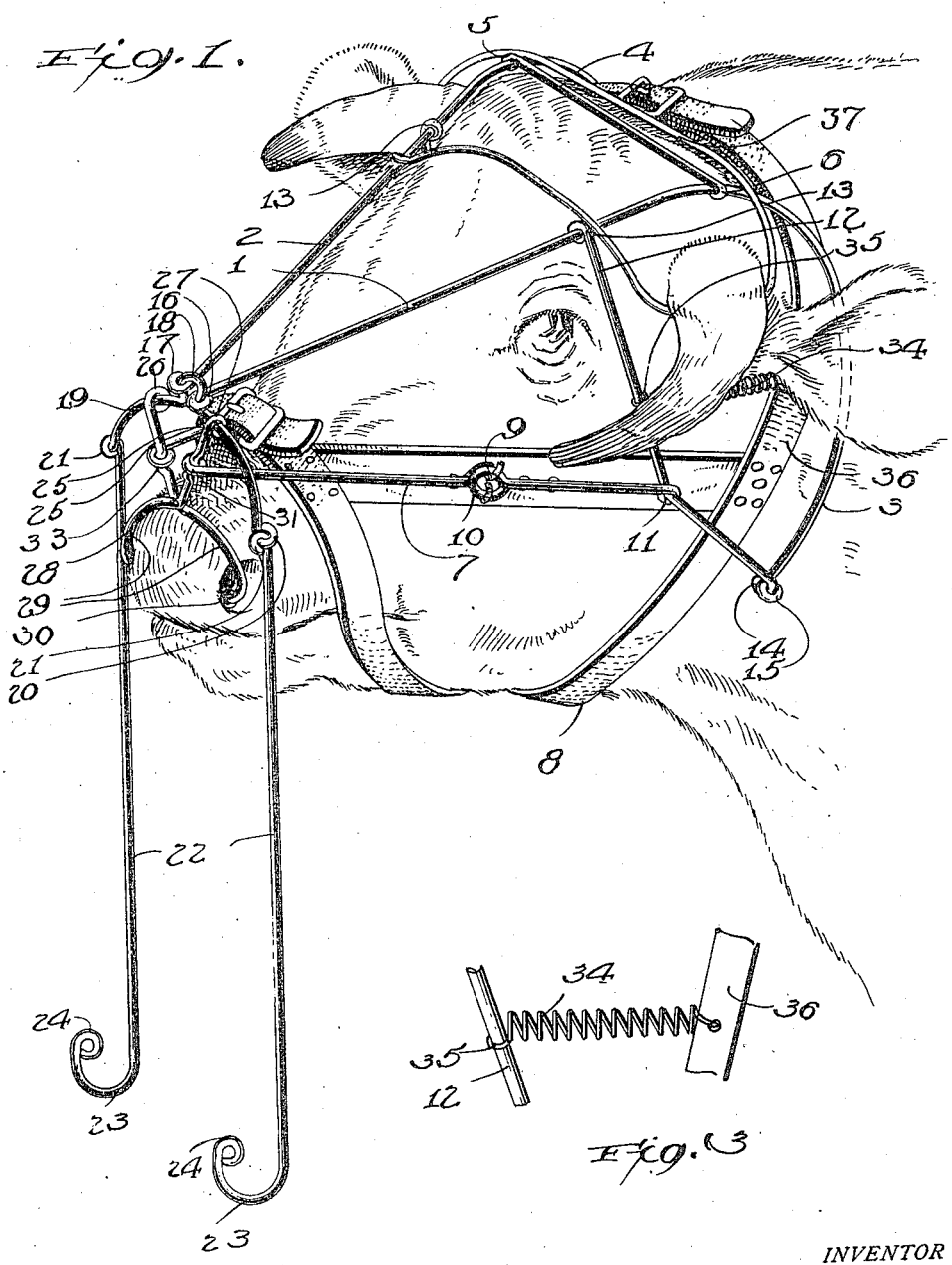

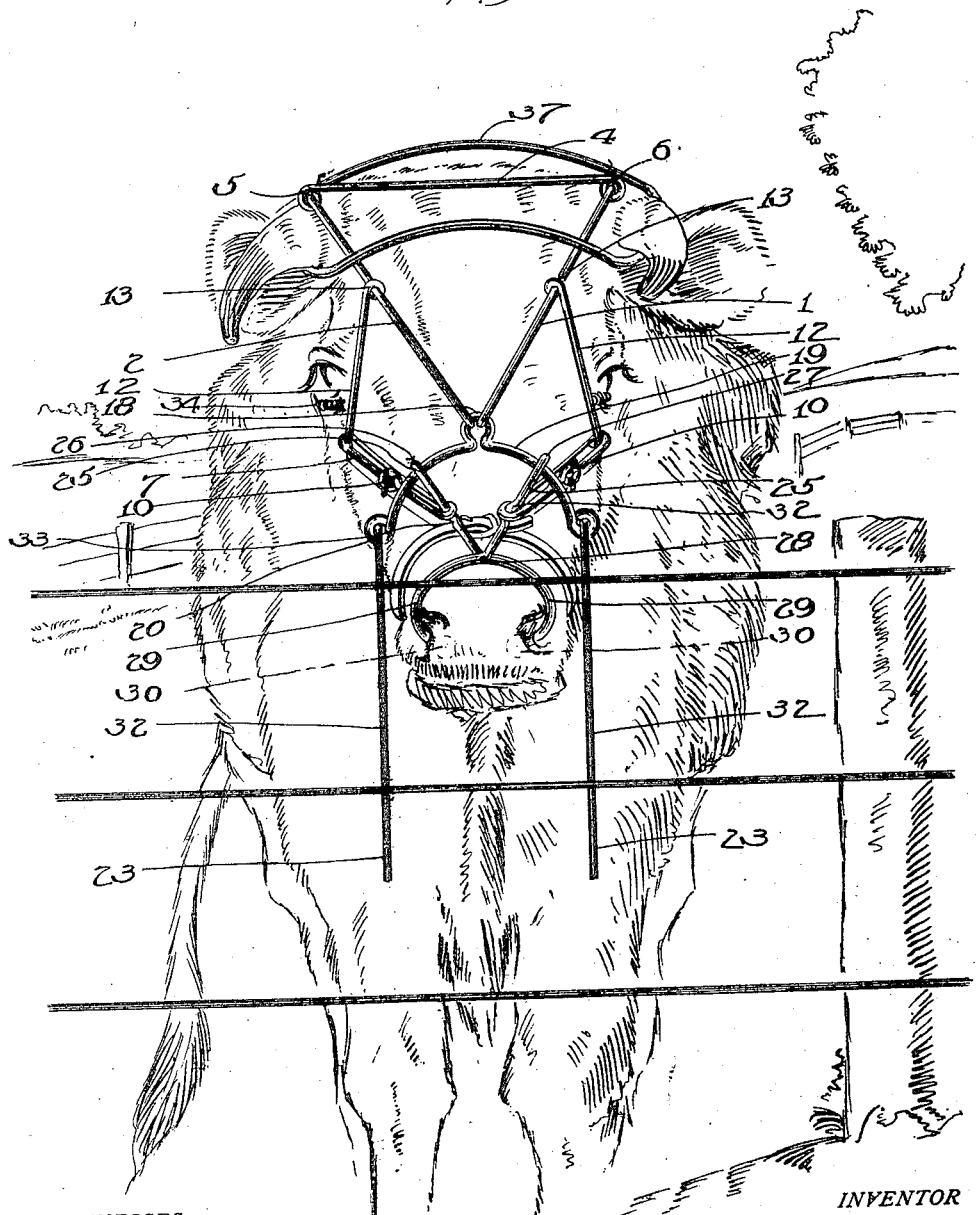

JOHN E. WITTE, OF MELBOURNE, IOWA.

NIMAL-POKE.

1,051,181.  Specification of Letters Patent.  Patented Jan. 21, 1913.

Application filed June 8, 1912. Serial No. 702,468.

*To all whom it may concern:*

Be it known that I, JOHN E. WITTE, a citizen of the United States, residing at Melbourne, in the county of Marshall and State of Iowa, have invented certain new and useful Improvements in Animal-Pokes, of which the following is a specification, reference being had therein to the accompanying drawing.

This invention relates to animal-pokes and has for its object the production of an efficient means for automatically clenching the animal's nostrils when it tries to force its head through a fence.

Another object of this invention is the production of an efficient clenching member which is adapted to automatically close when downward pressure is brought to bear upon the clencher supporting yoke.

With these and other objects in view this invention consists in certain novel combinations, constructions, and arrangements of parts as will be hereinafter fully described and claimed.

In the accompanying drawings:—Figure 1 is a perspective view of the device attached to an animal's head. Fig. 2 is a front elevation of the device in its correct position upon the head of an animal. Fig. 3 is an enlarged detail view of the upper portion of the frame.

Referring to the accompanying drawings by numerals it will be seen that this device consists of the similarly constructed frames 1 and 2, which are provided at their inner ends with the downwardly extending curved portions 3, which normally rest behind the horns of the animal and prevent the device from slipping off. A link member 4 is connected by means of the eyes 5 and 6 to the frames and is adapted to prevent said frames from spreading. A strand 7, which is mounted upon the halter 8 by means of the fastening means 9 which pass through the eye 10, is positioned substantially parallel with the frame member 1, and has an eye member 11 formed on its inner end which is adapted to engage the angular brace member 12. One end of this angular brace member 12 is connected to the frame 1 by means of the eye 13. An eye 14 similar to the eye 13 is formed upon the lower end of this angular brace member and engages the eye 15 formed upon the lower end of the curved portion 3. It will be seen that by use of this angular brace member a pocket is formed, which is adapted to fit over the horns and ears of the animal when the device is in its correct position, and also limits the lateral movement of the strand 7, since the eye 11 fits in the angle.

The lower ends of the frame members 1 and 2 are provided with the eyes 16 and 17, which are connected to the loop 18 formed upon the clencher supporting yoke 19. The lower ends of the clencher supporting yoke 19 are provided with the eyes 20, which engage the eyes 21 formed upon the depending arms 22, said depending arms 22 provided with the curved portions 23 and loop 24, which are adapted to engage the strands of wire or rails of a fence.

The clenching tong which is provided with the upwardly extending arms 25 is slidably mounted upon the yoke 19 by means of the eyes 26 and 27, which are adapted to slide upon the yoke 19 when downward pressure is brought to bear upon the depending arms 22. The clencher tong is pivotally mounted at 28 and is provided with the bowed portions 29, which are adapted to straddle the nose of the animal and normally fit within the nostrils. It will be seen when the downward pressure is brought to bear upon the depending arms 22 the yoke 19 will be drawn downwardly and the arms 25 will be compressed and in this manner will close the bowed portions 29. When these portions are closed the animal is subject to severe pain, since the head 30 of the bowed portions 29 will pinch the nostrils. As soon as the arms 22 are relieved of the downward pull, the yoke 19 will open and the clenching tong, since it is slidably mounted upon the yoke 19, will also open and in this manner will relieve the animal of the pain caused by the clenching. It will be seen that the depending arms 22 will swing freely since they are provided with the pivot eyes 20 and 21, and will allow the animal to eat without causing the clenching tong to close.

The outer end of the strand 7 is provided with the eyes 31, which engage the corrugations 32 and 33 formed upon the upwardly extending arms of the clenching tong. It will be seen that by use of this strand 7 a clenching tong is securely held in engagement with the animal's nose and at the same time forms a resilient means for opening the tong after the depending arms have been relieved of the downward pull.

A coil spring 34 is mounted upon the angular brace 12 at 35, while the other end engages the halter 8 at 36. By use of this spring 34 an efficient connector means between the poke and the halter is produced which is designed to hold the poke upon the animal's head.

The poke is held closely upon the front of the animal's head by means of the retaining link 37, which normally encircles the animal's horns and engages the upper portion of the frames.

Having thus described the invention what is claimed as new, is:—

1. An animal-poke of the class described comprising a pair of substantially parallel frames, a clencher supporting yoke carried by the lower ends of said frame, depending arms carried by said yokes, said arms adapted to engage a fence, a clenching tong slidably mounted upon said clencher supporting yoke, said clenching tong adapted to be automatically closed when pressure is brought to bear upon said clencher supporting yoke by means of said arms, and means for holding said poke upon the head of an animal.

2. An animal-poke of the class described comprising a pair of substantially parallel frames, strands positioned below said frames, brace members carried by said frames, the upper ends of said frames engaging said brace members, a clencher supporting yoke carried by said frames, a loop formed upon the upper side of said yoke, said loop adapted to engage the lower ends of said frames, a clenching tong carried by said frame, said clenching tong provided with upwardly extending corrugated arms, said arms adapted to slide upon said clencher supporting yoke, a plurality of bowed portions adapted to straddle the animal's nose and fit within the nostrils, said bowed portions being formed integral with said corrugated arms, depending arms hingedly mounted on the lower ends of said clencher supporting yoke, said depending arms provided with fence engaging portions, the lower ends of said strands engaging said upwardly extending arms at said corrugated portions for holding said clenching tong upon the animal's nose, said clenching tong capable of being closed when downward pressure is brought to bear upon said clencher supporting yoke, and means for holding said poke upon the head of an animal.

3. An animal-poke of the class described comprising a pair of substantially parallel frames, each of said frames terminating in a downwardly extending curved portion, an angular brace member carried by each frame and engaging the lower end of said curved portion, a strand positioned below each frame and substantially parallel thereto, each strand adapted to engage one of said angular brace members at the angle formed thereon, said curved portion of said frame and said angular brace member forming a pocket for receiving the horn and ear of the animal, a retaining link fitting over the horns of the animal adapted to hold the frames in a flat position upon the animal's head, means carried by the front end of said frames for gripping the nostrils of an animal, and guard arms depending from said last mentioned means to grip the animal's nostrils when said depending guard arms are brought into contact with a fence.

4. An animal-poke of the class described comprising a halter, a pair of substantially parallel frames, angular brace members carried by said frames and adapted to engage the ends of said frames, coil springs carried by said angular brace members, the other end of said springs engaging said halter for holding said animal-poke in its correct position upon the head of the animal, means carried by the front end of said frames for gripping the nostrils of an animal, and guard arms depending from said last mentioned means to grip the animal's nostrils when said depending guard arms are brought into contact with a fence.

In testimony whereof I hereunto affix my signature in presence of two witnesses.

JOHN E. WITTE.

Witnesses:
J. H. BAGLEY,
ALBERT SANDEMAN